United States Patent

[11] 3,554,502

[72] Inventors Grover W. Rye
Cuyahoga Falls;
Alexander V. Alexeff, Cleveland, Ohio
[21] Appl. No. 729,282
[22] Filed May 15, 1968
[45] Patented Jan. 12, 1971
[73] Assignee The Goodyear Tire & Rubber Company
Akron, Ohio
a corporation of Ohio

[54] DRYER OR HEATER
15 Claims, 8 Drawing Figs.
[52] U.S. Cl. ................................................ 263/3, 34/155
[51] Int. Cl. ........................................... F27b 9/28
[50] Field of Search........................................... 34/48, 155, 156, 160; 263/3

[56] References Cited
UNITED STATES PATENTS
3,406,954  10/1968  Fannon ....................... 263/3

| | | | |
|---|---|---|---|
| 2,807,096 | 9/1957 | Kullgren et al. .............. | 34/48X |
| 2,807,097 | 9/1957 | Kullgren et al. .............. | 34/48 |
| 3,008,243 | 11/1961 | Kawaguchi ................... | 34/160 |
| 3,183,605 | 5/1965 | Argue.............................. | 34/160x |
| 3,293,770 | 12/1966 | Rauskolb....................... | 34/48 |

Primary Examiner—Edward J. Michael
Attorneys—F. W. Brunner and Jack M. Young

ABSTRACT: A machine or apparatus for coating, heating or drying fibers in a continuous length element; a machine for impregnating such fiber with a liquid fiber-to-rubber adhesive coating in the manufacture of rubber products; or an apparatus wherein the element is heated and heat products are removed from said element by a gas stream rapidly moving over the surface of said element, wherein said heat products are evaporated water molecules for rapidly drying the element, heat, or other products resulting from heating this element.

INVENTORS
GROVER W. RYE
ALEXANDER V. ALEXEFF
BY
Jack M. Young
ATTORNEY

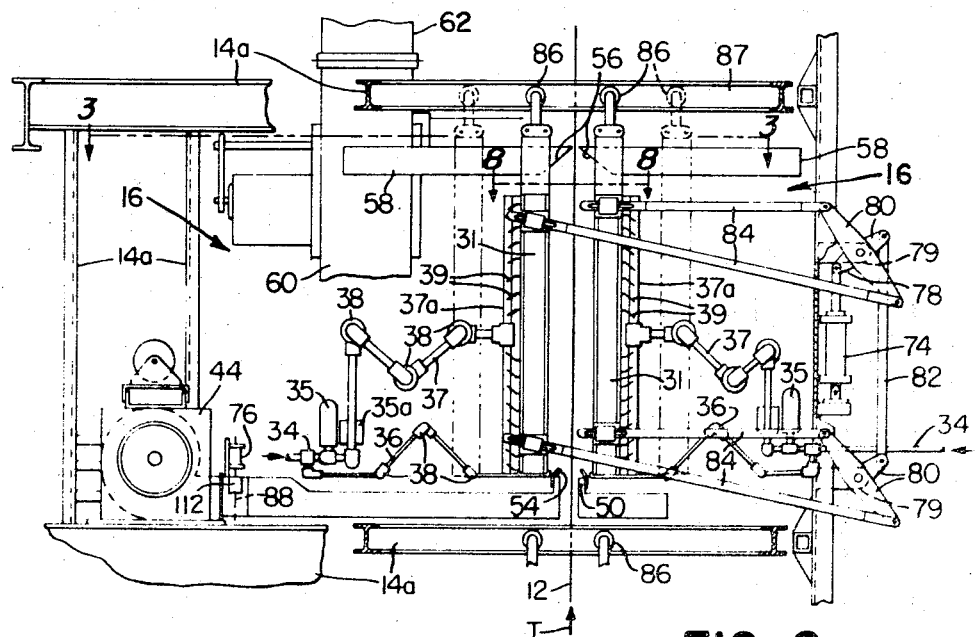
FIG. 2
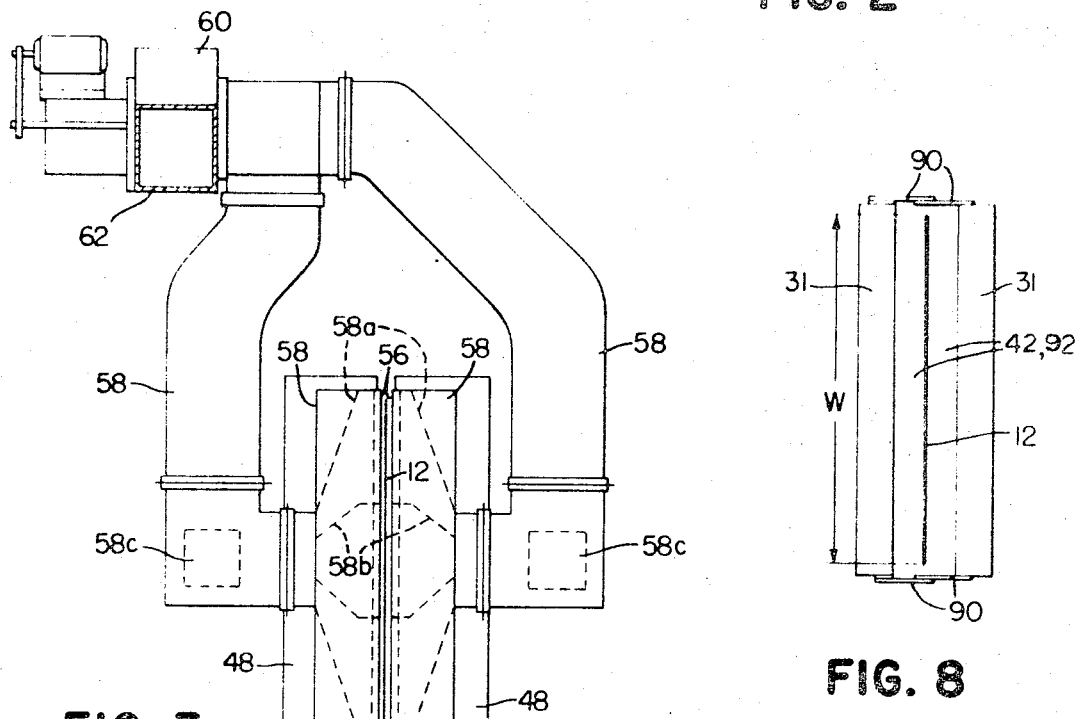
FIG. 3
FIG. 8
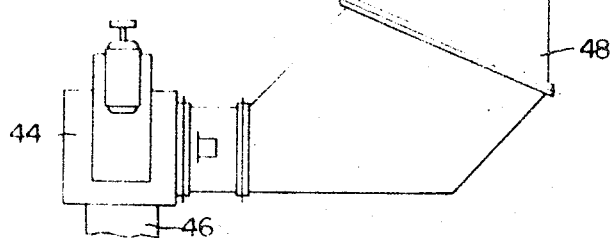
INVENTORS
GROVER W. RYE
ALEXANDER V. ALEXEFF
BY Jack M. Young
ATTORNEY

PATENTED JAN 12 1971

INVENTORS
GROVER W. RYE
ALEXANDER V. ALEXEFF

BY

*Jack M. Young*
ATTORNEY

INVENTORS
GROVER W. RYE
ALEXANDER V. ALEXEFF

Jack M. Young
ATTORNEY

DRYER OR HEATER

The foregoing abstract is not to be taken as limiting the invention of this application, and in order to understand the full nature and extent of the technical disclosure of this application, reference must be made to the accompanying drawings and the following detailed description.

BACKGROUND AND SUMMARY OF THE INVENTION

This invention relates to heaters, including dryers, and more particularly to heaters for fibers (whether in yarn, cord, fabric, etc. form), especially such fibers to be used in the manufacture of tires, belting and other rubber products; and to the machine for impregnating such fibers by dipping into a liquid fiber-to-rubber adhesive and subsequently drying the same.

The rubber products industry uses various fibers for reinforcement, including rayon, nylon, polyester, Fiberglas, etc. and may use now or hereafter other natural and artificial fibers. The term "fiber," unless otherwise modified, is intended to be used in its generic sense to include all of these fibers. This machine is adapted to process by dipping and drying any continuous length element, such as a woven fabric made up of cord formed of fibers, a yarn made up of fibers before being twisted into cord and woven into fabric, etc. Dipping the yarn is usually done where application of the adhesive over the entire surface of the fiber is desired, such as with Fiberglas; while other fibers are dipped in the fabric form. Therefore, the terms "continuous length fiber element," "continuous length element," "fiber element" or "element" used herein, unless otherwise modified, are each intended to cover any continuous length yarn, cord or fabric since each is composed of fibers. The term "fabric" unless otherwise modified, is intended to cover any suitable fabric, including square woven fabric and including so-called "cord fabric" used for tires and having a fairly open and loose weave wherein the cords form the warp and a comparatively small number of fill threads connect the cords solely to facilitate handling.

It is well known that before any such element made of textile material can be incorporated into rubber articles, especially those to be subjected to drastic conditions of flexing or bending, the fibers thereof must be prepared by coating or impregnating with an adhesive that will bond well to both rubber and the fibers. These adhesives are dispersed, dissolved or suspended in a liquid vehicle, generally water, into which the element is dipped and subsequently dried.

Such elements have been dried by blowing hot air through a drying oven in a relatively low temperature. Because of the low drying temperature and the attendant low speed of operation, large capacity drying ovens have been necessary so as to require vast expenditures of capital and large factory areas for operation. It has been recognized that if such elements could be dried more rapidly, but at a controlled temperature to prevent deterioration of the fiber, the speed of drying could be vastly increased, or the size and capacity of the drying apparatus could be considerably reduced.

This invention is an improvement on the invention disclosed in the T. M. Kersker et al. U.S. Pat. No. 3,250,641, granted May 10, 1966, and entitled "Method of Processing Tire Cords, Tire Cord Fabric, And The Like" wherein infrared radiation is used to speed up the drying and many of the problems in such element processing for rubber goods manufacture are explained in some detail to which reference may be had if desired. The dryer must be of sufficient size to dry the adhesive liquid coating sufficiently so that the coating will not be picked off or ruptured by the support means engaged following the drying step.

The present invention relates to a machine or to an apparatus for coating, heating and/or drying a continuous length element, and more particularly to a machine for impregnating such element with a liquid fiber-to-rubber adhesive in a coating in the manufacture of tires, belting and other rubber products; or to a heating apparatus wherein the element is heated and heat products are removed from said element by a gas stream rapidly moving over the surface of said element, wherein said heat products are evaporated water molecules for rapidly drying the element at a controlled temperature, or heat when maintaining the heated up element at a controlled or preselected heated temperature, or other products resulting from heating this element; or to a machine used to expose the fibers to the appropriate time and temperature conditions at a preselected temperature in the process known in the art as heat setting, such as used for nylon to give it the desired molecular structure and other characteristics.

An object of the present invention is to provide an apparatus for rapidly and uniformly heating or drying a fiber containing element at a controlled temperature so as to manufacture a maximum quality article by minimum sized equipment.

Another object of the present invention is to provide a method of and apparatus for dipping and drying fibers at a very high temperature and speed without detriment to the fibers or any coating thereon.

Another object of the present invention is to provide an apparatus wherein an element is heated and heat products are removed from said element by a gas stream rapidly moving over the surface of said element, wherein said heat products are evaporated water molecules for rapidly drying the element, heat, or other products resulting from heating this element.

These and other objects of the present invention will become more fully apparent by reference to the appended claims as the following detailed description proceeds in reference to the accompanying drawings.

BRIEF DESCRIPTION OF THE DRAWINGS

In the drawings,

FIG. 2 is a side elevational view of two of the heating or drying apparatuses located within the heating or drying tower, having some parts omitted or cut away, and having opposed heating zones sandwiching therebetween opposite faces of the element;

FIG. 3 is a top plan view, taken generally along the line 3—3 in FIG. 2, and showing only the element and the gas moving means for discharging the gas streams into and through the heating zones and subsequently exhausting them from the apparatuses in FIG. 2;

FIG. 8 is a top plan view taken generally along the line 8—8 in FIG. 2 of the gas stream flow duct, infrared panels and reflector means surrounding the element.

DETAILED DESCRIPTION OF THE PREFERRED EMBODIMENTS

Figure 1:
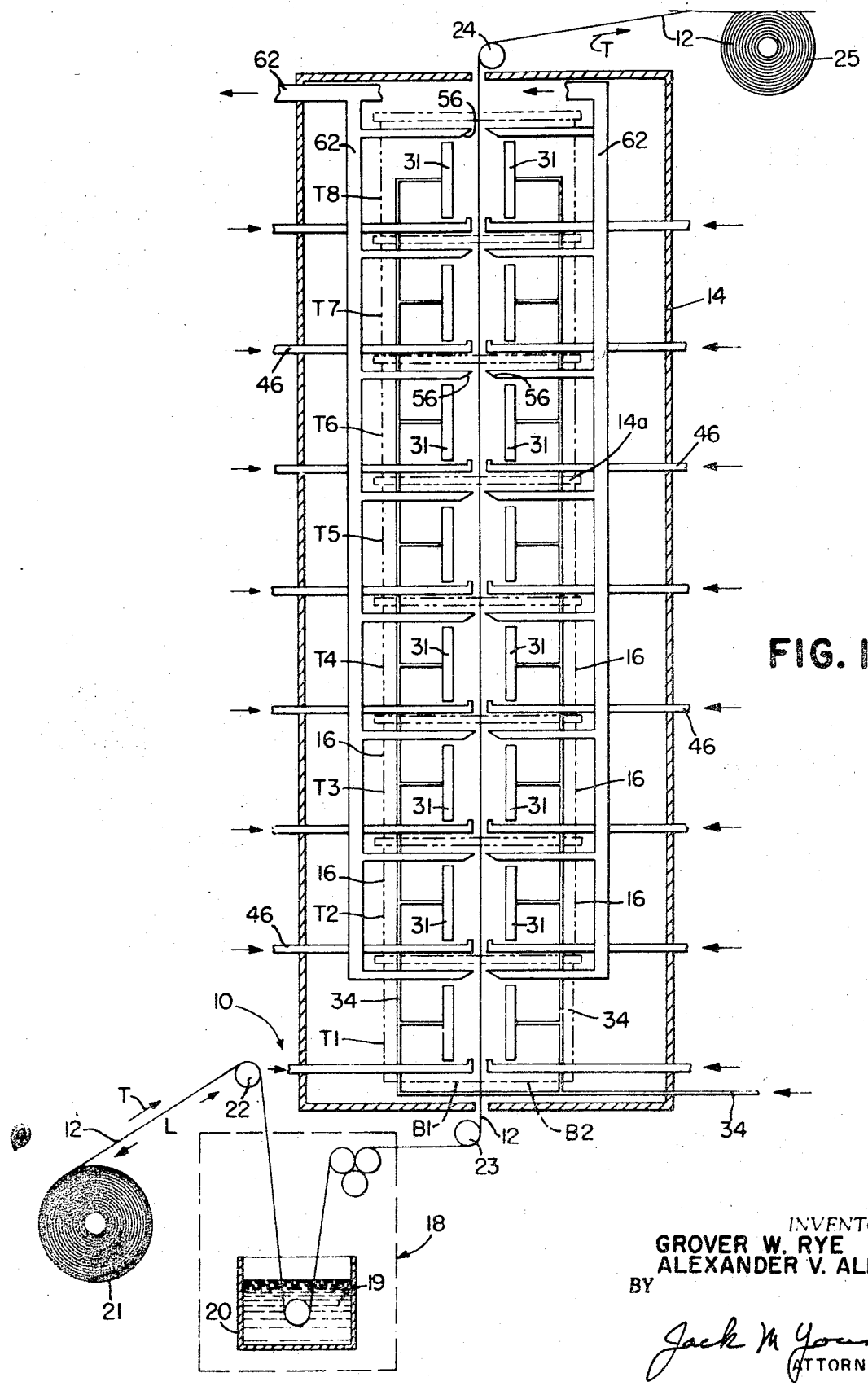
FIG. 1 is an elevational schematic vertical view, partially in section, of a machine or apparatus for coating such element and subsequently drying the coating in a drying tower.

FIG. 1 of the drawings shows machine 10 for treating continuous length fiber element 12 by applying adhesive thereto and subsequently drying the adhesive with machine 10 including heating or drying tower 14 (taking the form of either a separate tower or one zone of an element processing building) having structural members 14a supporting 16 substantially identical heating apparatuses or dryers 16, to be described in more detail hereinafter.

Although machine 10 can be used for treating any suitable fiber element 12 (such as yarn, cord or fabric), a woven fabric will be specifically used hereafter in this description with this fabric having a length dimension L along its direction of movement T by drive rolls 22, 23 and 24; a width dimension W transverse thereto; and opposite, generally parallel faces F1 and F2.

Since each apparatus 16 is especially adapted for driving moisture out of fibers or fabric, it should be apparent that it has many other uses, such as driving moisture out of woven fabric before calendering in the manufacture of rubber goods.

Figure 7:
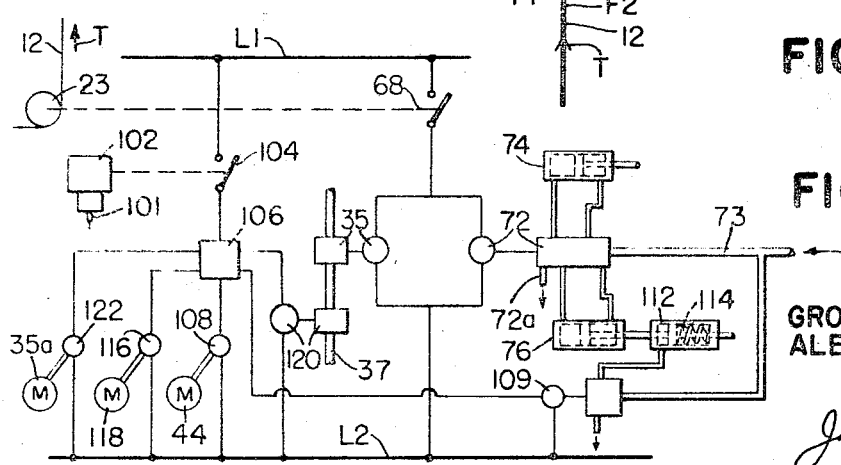
FIG. 7 is an electrical and fluid flow diagram of the solenoid gas valves controlled main burner gas line to the infrared burners, valves controlled flow diagram of the fluid system for the burner panel retracting cylinder and gas flow damper cylinders, and the electrical circuit for controlling the solenoids operating these valves in response to the travel speed of the processed element or the temperature of the element, for maintaining the fabric element at a preselected temperature, and for shutting off the infrared burners.

Although apparatus 16 is specifically described for purposes of illustration herein as a dryer, it will be readily apparent as this description proceeds that apparatus 16 is broadly any type heating apparatus with gas stream 42 (described in more detail hereafter) adapted for removing from element 12 any infrared generated heat products, whether these heat products be evaporated water during drying or heat, such as while rapidly heating element 12 to a preselected temperature and maintaining it at that preselected temperature by the cooling action of stream 42 carrying away any excess heat with or without suitable control means shown in the left-hand portion of FIG. 7 and described in more detail in one section of the specification hereinafter. "Infrared generated heat products" and "heat products" are defined herein to include water vapor and molecules evaporated from element 12, heat removed from element 12, evaporated volatiles, and other products resulting from heating element 12 with infrared heat.

Machine 10 in FIG. 1 sequentially moves fiber element 12 in travel direction T from feed roll 21 through coating means 18, through heating or drying tower 14 having 16 heating or drying apparatuses 16 with each having infrared heating means 28, overdrive roll or support means 24 with fiber element 12 freely supported between drive rolls 23 and 24 from the bottom or inlet to the heating zones 40 provided by tower 14, and onto windup roll 25 or to subsequent heat treating and/or other processing equipment.

Coating means 18 includes tank 20 containing any well-known fiber-to-rubber adhesive 19 dissolved, dispersed, or suspended in a liquid vehicle. Such adhesive is generally based on resorcinol-formaldehyde resins and late in an aqueous medium.

Suitable drive means is provided for relatively moving element 12 through machine 10 comprising coating means 18 and tower 14. This drive means takes the form herein of suitable tensioning or support rolls 22, 23 and 24 with any one or all driven by a suitable motor driven drive or independent motors to advance element 12 through machine 10 and to apply suitable tension to element 12. When fabric element 12 has a width W of about 60 inches, 2,000–25,000 pounds tension thereon will be the operating range for different fibers, and this tension is used for further processing thereof after the adhesive has been dried and for maintaining the fabric taut and planer against lateral deflection and flapping by gas streams 42 mentioned hereafter.

Element 12 is freely supported in tower 14 so that the coating thereon will not be damaged during the drying thereof. There must be sufficient drying capacity in tower 14 to dry the liquid coating sufficiently so that the coating will not be picked off or ruptured by support roll 24. Hence, it is preferable not to use a drum-type drier or any other type cylindrical supports in the heating zones 40 because they will tend to pull off the adhesive covering. Also, an air cushion cannot be used to suitably support cord fabric on such drum or roller since the air would quickly penetrate any open weave of the fabric and the 25,000 pounds maximum tension would quickly bring the fabric into contact with the cylindrical surface.

It has been found in practice that drying apparatus 16 in tower 14 manufactures maximum quality element 12 with minimum equipment size.

Figure 4:
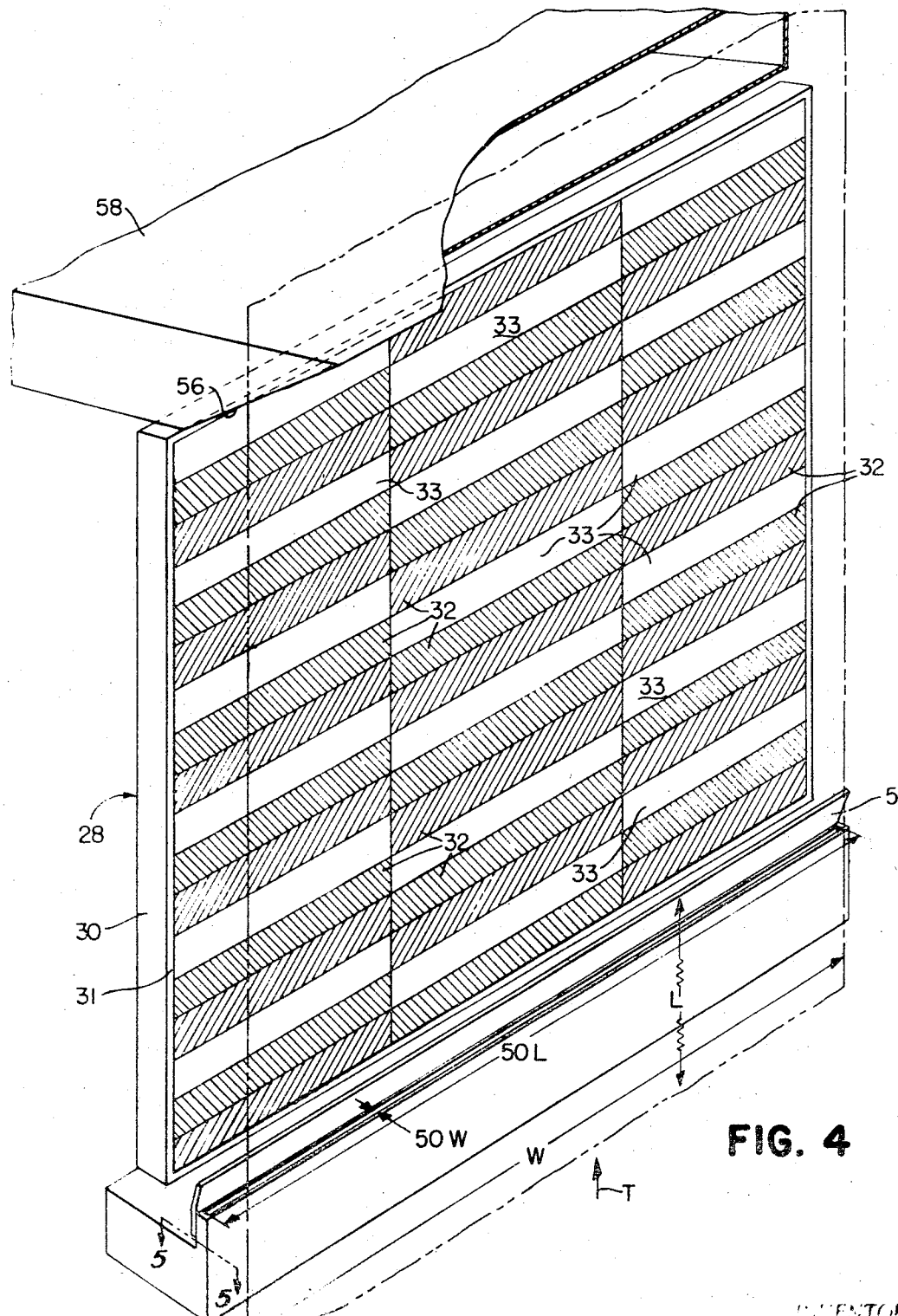
FIG. 4 is a perspective view by the fabric element of one of the heating apparatuses in FIG. 2 with some parts omitted or cut away for clarity.

Machine 10 has a plurality of apparatuses 16 therein for heating or drying the fibers in the yarn or fabric in continuous length element 12. These are arranged in eight tiers T1—T8, and in two banks B1 and B2 so that each of 16 apparatuses 16 therein may be identified as to location, as to tier and bank, such as the apparatus in the lower left-hand corner of FIG. 1 being identified as apparatus 16 in tier T1, bank B1. Apparatuses 16 in each bank are arranged in series along the length of the fabric in the tiers while any two horizontal apparatuses 16 in opposite banks B1 and B2 and in the same tier are arranged on opposite sides of fabric element 12 as it passes through tower 14. Apparatus 16 in each tier and bank has a width wider than fabric element 12, as shown in FIGS. 3, 4 and 8, to provide a proper heating or drying action as will be brought out in more detail hereinafter.

Heating or Drying Apparatus 16

The remainder of this application will be directed toward the specific structure, mode of operation and advantages of each substantially identical apparatus 16 for heating or drying and considered either alone or in any tier or bank combination. The explanation hereinafter of apparatus 16 will emphasize the details in apparatus 16 in tier T2, bank B1 even though all 16 apparatuses 16 in FIG. 1 are identical in construction except the two apparatuses in each tier have some common operating parts (see FIGS. 2, 3 and 8) and the apparatuses in bank B1 are substantially mirror images of those in bank B2. Then, the structure and mode of operation common to the two horizontally aligned apparatuses 16 of tier T2 for both banks B1 and B2 will be described; later, the eight series arranged and vertically aligned apparatuses 16 in tiers T1—T8 in bank B1 will be described.

For reference herein a typical operating example of apparatus 16 will be given now. It has been found that an actual operating drying apparatus 16 operates satisfactorily with approximately the following dimensions and operating characteristics (herein referred to as table I):

Fabric element 12:
    Width W—60".
    Travel speed in direction T—100 yds. per minute.
    Weight—1 lb. per yd. of length.
    Water picked up was equal to weight of fabric.
    Tension—2,000–25,000 pounds.
Horizontal distances:
    Between reflector plates 90—75".
    Face of burner panel 31 to fabric element 12— 7"–10".

Approximate dimensions within frame 30 of burner panel 31 for burners 32 and spacer blocks 33:

Height—4'10".
    Width—5'6".
Discharge nozzle 50:
    Dimensions 50W—1½".
    Dimension 50L—5'9".
    Discharged air velocity: (Feet per minute)— 1,000–2,000.
    Air discharged quantity:
        (Cubic feet per minute)—1,500 (max.).
        (½ output of fan 44).

Temperatures at downstream side of drying apparatus 16 at exhaust nozzle 56 at top of apparatus 16

|  | ° F. |
|---|---|
| Fabric | 200 |
| Air | 186 |

Each apparatus 16 includes heating means 28, preferably of an infrared emitting or radiating type, for drying element 12. Although heating means 28 may use any suitable infrared source, such as an electric quartz tube heating element, etc., it is preferred to use herein an infrared heater 32 having a fluid (preferably natural gas) fired flame for generating infrared radiation because of its economy of operation, rapid cooling, efficient heat transfer, and desirable radiating characteristics. One suitable form of heater 32 is that disclosed in U.S. Pat. No. 2,775,294 granted Dec. 25, 1956 to G. Schwank and entitled "Radiation Burners" wherein a gas-air mixture burns on the outer surface of plate 7 in that patent to heat it to incandescence causing this surface to emit infrared radiation then striking and heating element 12. Such burner 32 has a metal screen mounted about one-fourth inch from this radiant surface, extending parallel thereto, and being substantially coextensive with this surface serving as a reradiating screen to increase the burner efficiency and to assist in providing a uniform distribution of infrared radiant energy in the manner well known in the art. Then, combustible gas mixed with air burns so that the outer radiating surface of plate 7 has a visibly radiant temperature of approximately 1,300° F. —1,600° F. with the radiation intensified by the reradiating screen.

Heating means 28 includes infrared heating panel 31 in FIG. 4 having spacer blocks 33 and heaters 32 (shown schematically by diagonal lines in FIG. 4) arranged in a checkerboard-type pattern within its frame 30 to provide a planer, radiating face on panel 31 parallel to and facing element 12 surface F1.

The intensity and pattern of radiation desired may be varied. Since the intensity of radiation generally varies inversely as the square of the distance between the objects since one considers a point source of radiation radiating out over the entire interior surface of a surrounding sphere, it would be logical to assume that changing the distance between the radiating face of panel 31 and element surface F1 would be the desirable way of changing the intensity of radiation on surface F1. This is not true here since the radiating face of panel 31 is not a point radiating source but is approximately parallel and coextensive with surface F1 in heating zone 40. Hence, radiation intensity is not effected by the distance between the radiant face of panel 31 and element surface F1. Even the radiation that might normally escape outwardly horizontally in the space between panel 31 and face F1 is held between their parallel faces and reflected back onto fabric element face F1 by reflector plates 90, which will be described in more detail hereinafter. Therefore, the desirable way to change the intensity and pattern of radiation desired is to change the number of heaters 32 and the number of spacer blocks 33 located within frame 30 of panel 31 and to change their distribution within frame 30.

Each heater 32 and 31 is fed by gas main line 34 in FIGS. 1 and 2. Gas entering drying tower 14 through gas main line 34 travels in FIG. 2 either: 1through solenoid gas valve 35 to be mixed with air by air mixer 35a before going through main burner gas line 37 into vertically extending manifold 37a on the back of panel 31 having flexible hoses 39, one leading from manifold 37a to each infrared burner 32, or 2through pilot gas line 36 to the burners on the radiant face of panel 31. Any suitable conventional igniter and safety features are provided. Each gas line 36 and 37 has pivotal connections 38 therein adapted to permit pivoting of the line components about a horizontal axis during horizontal movement of radiant heating panels 31 between solid and dot-dash line positions in FIGS. 2 and 6, as will be described in more detail hereinafter.

Each infrared heating panel 31 heats an infrared heating zone 40 on the outer surface of element 12, such as on face F1 or F2, and the desired action in each heating zone 40 is to rapidly and uniformly dry fabric element 12 at a controlled temperature. This action is obtained in the present disclosure by rapidly and uniformly evaporating the moisture by the infrared radiation from panel 31, and by rapidly and uniformly removing by mass transfer the evaporated liquid molecules and heat from fabric element 12 in this heating zone 40 by heating apparatus 16. The following paragraphs will explore this mode of operation more carefully and more specifically.

Infrared radiation from burner 32 is an efficient method of heat transfer to provide the energy necessary to evaporate the water into its vapor form and is much better than many other type high temperature heating sources. Infrared waves extend over the spectrum in wave length from 0.8 to 300 microns from the near infrared to the far infrared range. There is a broad absorption band for water, several microns wide, about at 3 microns wave length in the near infrared region where water is evaporated most quickly and most efficiently. The aforementioned Schwank-type infrared burner 32 emits strong radiation in this absorption band for water vapor for efficiently and rapidly vaporizing the water or aqueous molecules in the coating. The moisture within the fibers and adhesive coating is heated and evaporated within the time period necessary to dry the adhesive coating on the surface of the fibers while still permitting the moisture to escape therefrom before the outer surface of the adhesive is dried and/or cured sufficiently to form a skin or crust entrapping the remaining moisture.

Any suitable gas may be used, but air is specifically used herein even though the generic term "gas" is used wherever appropriate since any suitable gas may be used. A gas moving means moves gas stream 42 with respect to outer surface F1 of element 12 through heating zone 40 during infrared heating of surface F1 for removing infrared generated heat products from surface F1. These removed heat products may take the form of: 1heat removed from surface F1 for controlling the temperature of surface F1 by a cooling action, and/or 1liquid molecules, such as water molecules, evaporated by the infrared and removed by gas stream 42 by mass transfer by scrubbing surface F1 with stream 42 so as to rapidly dry element 12 at a controlled temperature. Stream 42 is a rapidly flowing river of gas blowing at surface F1 and traveling along surface F1 being heated or dried by the infrared. With fabric element 12 saturated with water based chemicals 19, a fast rate of drying of element 12 to remove the water is highly desirable. Fast drying results in minimum equipment size, improved control of drying conditions, and improved quality of element 12. The evaporated liquid molecules carried away by stream 42 include, of course, not only water molecules but molecules of any volatile material. The rate of drying is increased by removal of liquid molecules from surface F1 to allow better penetration of infrared energy and by the efficient mass transfer of water molecules to the gas by a scrubbing or vacuuming action of surface F1 by flowing stream 42. Flowing stream 42 also removes convectional heat from drying zone 40 and from fabric element 12 so as to provide a rigid control of the temperature of the fabric element so that it will not exceed the safe limit. The gas in stream 42 is cool enough to cool element 12 as it passes across it. This is a peculiar problem to a fabric, such as nylon, some types of which might be damaged if the temperature exceeded 250° F. Not all objects dried require this close temperature control by cooling; for example, ceramics, painted metal parts, etc. preferably pick up as much heat as possible and cooling is not desired since cooling is a detriment to efficient operation. It should be apparent that velocity of stream 42 will affect the extent of scrubbing action and rate of drying and the overall quantity of air flowing in stream 42 will affect both rate of drying and heat removal. Preferred condition of the gas in stream 42 is a relatively dry and cool gas, such as air at ambient conditions. The cool gas will have a greater capacity for heat pickup, and the dry gas will pick up the moisture and other evaporated molecules more quickly and is more transparent to infrared radiation from panel 31. Moisture laden gas interferes with the transmission of infrared rays (because it absorbs this infrared radiant energy) and interferes with efficient drying and heat transfer. Therefore, if gas stream 42 is heavily laden with moisture, it may substantially prevent transmission of the infrared rays from panel 31 to surface F1 and may serve as an insulating layer over surface F1 to prevent removal of heat and water vapor. Hence, recirculation of the gas in stream 42 would not be desirable because it would be hotter than desired so could not pick up more heat and could not cool element 12, and might well be saturated with evaporated molecules, such as water molecules, which would interfere with infrared transmission and pickup of evaporated water molecules. Hence, gas stream 42 permits infrared heaters 32 to operate at their most efficient temperature, is located as close as possible to fabric face F1 for fast drying, and still permits accurately controlling the surface temperature of element 12 to prevent damage thereto. Note that the infrared radiation from heaters 32 strikes heating zone 40 to provide drying at the same time as gas stream 42 scrubs the heating zone. This action provides most rapid drying with minimum size equipment.

The aforesaid gas moving means includes gas discharge means for directing gas stream 42 as a gas layer or gas curtain generally along and over surface F1 in heating zone 40 to provide the aforedescribed scrubbing action. Since air of the condition described in the preceding paragraph is preferred, relatively cool, dry air at ambient conditions is drawn in through inlet duct 46 in FIGS. 1, 2 and 3 (shown schematically in FIG. 1 as two inlet ducts 46 for each tier for simplicity of illustration instead of the single inlet duct 46 in FIGS. 2 and 3) by motor driven, discharge, fresh air or inlet fan 44 in FIG. 3 to be forced through nozzle duct 48 and out nozzles 50 in FIG. 2 to form two gas streams 42 for two apparatuses 16. In each apparatus 16, each gas discharge nozzle 50 is a rectangular outlet having its length 50L in FIGS. 4 and 5 many times greater than its width 50W. Nozzle 50 also has mounted on duct 48 by screws 53 adjustable cutoff plate 52 and has mounted on duct 48 deflector 54 described in more detail hereinafter.

Figure 6:
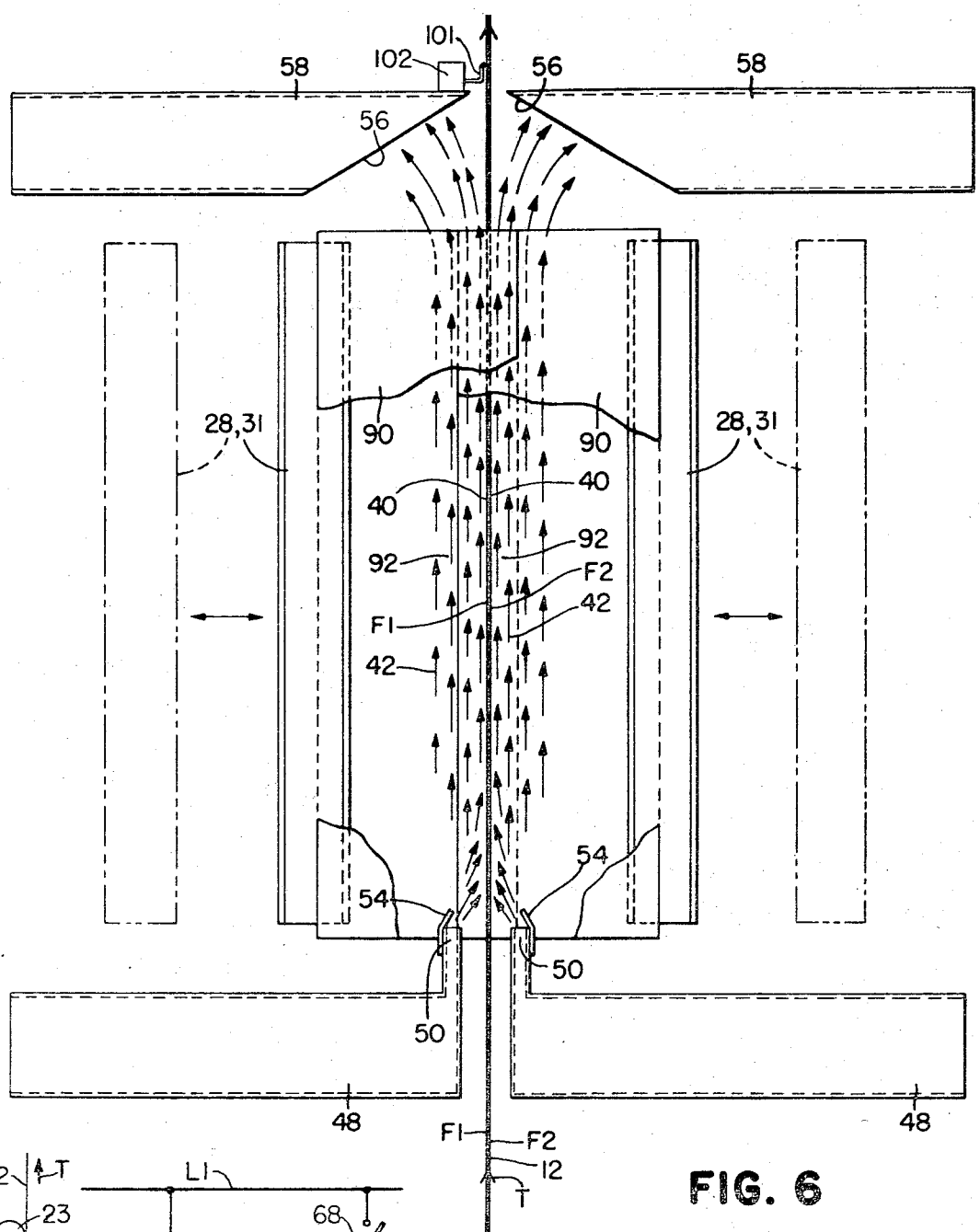
FIG. 6 is an enlarged, schematic, side elevational view with parts omitted or cut away showing the infrared heating and gas stream action on the element and certain selected parts in FIG. 2.

Discharge nozzle 50 is preferably mounted so that length dimension 50L is generally parallel to surface F1 of element 12 in heating zone 40 and width dimension 50W is generally perpendicular to surface F1 with nozzle 50 directing its discharged gas generally along surface F1 in heating zone 40 from the lower edge of this heating zone. It should be apparent that scrubbing action and heat removal will be obtained by having the discharged stream from nozzle 50 directed transversely across, longitudinally with (in cocurrent flow), or longitudinally against (in contraflow) travel direction T of element 12. Directing stream 42 across travel direction T (across element 12 width W) would not be desirable because stream 42 would not uniformly hit each portion of width W of fabric element 12 so that the fabric would not be uniformly processed across its width. Nozzle 50 may be mounted near one edge of heating zone 40 with its length dimension 50L generally parallel to width dimension W of fabric element 12 with air stream 42 directed in heating zone 40 generally along the length of movement T of element 12 either in the same direction (in cocurrent flow) or the opposite direction (in contraflow) to the movement T for generally uniformly removing liquid molecules over width W of element 12 to give width W uniform processing. Although stream 42 directed opposite to the direction of travel T (in contraflow) would give an effective scrubbing action, it has been found desirable to mount nozzle 50 at the bottom of heating zone 40, as shown in FIGS. 4 and 6, so that gas stream 42 is directed in direction T of element 12 (in cocurrent flow) with this direction being upward so that the natural convection will help move gas stream 42 toward gas exhaust vent 56.

Nozzle length dimension 50L should be at least as wide as width dimension W of fabric element 12 so that gas stream 42 will uniformly effect each increment of the fabric across its width as it travels in direction T. Dimension 50L should be preferably greater than fabric width W so that the lower velocity components in gas stream 42 emerging from the lengthwise ends of nozzle 50 do not travel across surface F1 and a more uniform velocity layer of gas in stream 42 travels along the length of element 12.

It is desirable to provide a generally uniform quantity of gas flowing over each portion of fabric element width W in heating zone 40 for generally uniformly removing the heat products across this width W, with such heat products being evaporated liquid molecules and heat for maintaining a generally uniform temperature across fabric element width W in heating zone 40 since drying and heat removal are directly proportional to the quantity of gas flowing in stream 42 and since the scrubbing action is proportional to the velocity of flowing stream 42. This uniform distribution of gas across width W may be obtained either by carefully designing nozzle 50 and maintaining its width 50W constant while providing certain desirable gas turning vanes and baffles within nozzle duct 48 and closely adjacent nozzle 50 to control the distribution of gas flow to nozzle 50, or by making nozzle 50 adjustable.

Figure 5:
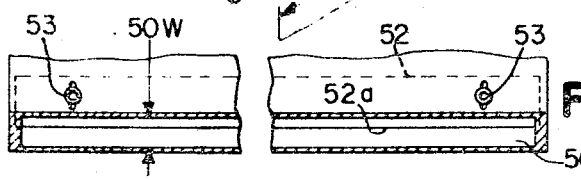
FIG. 5 is a horizontal sectional view, taken generally along the line 5—5 in FIG. 4, through the discharge nozzle and showing its adjustable flow control gate means.

Nozzle 50 may be made adjustable by providing in FIG. 5 cutoff plate 52 mounted by screws 53 in elongated parallel slots in the wall of duct 48 to serve as an adjustable flow control gate means with its flow controlling edge 52a intercepting the flow through gas discharge nozzle 50. Pivoting plate 52 about a vertical axis permits increasing or decreasing the quantity of gas flowing through either end of nozzle 50 so as to obtain uniform quantity of gas flow over element width W. However, since edge 52a acts like a sharp edged orifice to laterally disperse stream 42, after it emerges from nozzle 50, to strike the radiating faces of burners 32 to provide disadvantages mentioned in more detail hereinafter, it is preferably to have nozzle 50 discharge a closely held together jetlike stream 42 as a thin layer of gas traveling over face F1 by originally designing nozzle 50 to provide this condition. Suitable gas turning vanes, baffles and/or tubular extension of nozzle 50 into nozzle duct 48 are desirable to prevent this lateral dispersion.

It is desirable to have gas stream 42 directed toward surface F1 to increase the scrubbing action and heat transfer action. This may be done by so directing nozzle 50 or by adding gas stream deflector 54 mounted on gas discharge nozzle 50 for directing gas stream 42 not only over and along surface F1 but also toward and against surface F1, as seen by the arrows in FIG. 6, to serve with nozzle 50 as a gas discharge directing means. Directing gas stream 42 toward and causing it to impinge against surface F1 has the advantage of increasing the scrubbing and heat transfer action when stream 42 strikes surface F1 a glancing blow and of protecting against adversely affecting the flame generated infrared radiation from flame-type infrared burners 32, as mentioned in the next paragraph. Water vapor in a boundary layer on surface F1 will also interfere with the transmission of infrared ray thereto and removal of convection heat therefrom so that striking surface F1 by stream 42 is desirable to break up this boundary layer.

If gas stream 42 strikes the radiating face of burners 32, it may adversely affect the flame generated infraradiation from this flame-type infrared burner 32 by either adversely affecting the flame or by excessively cooling the outer infrared radiating surface on plate 7 in the aforementioned Schwank patent. The flame may be adversely affected by being blown out, sucked off the outer radiating surface of radiating plate 7 in the Schwank patent by the Venturi effect under Bernoulli's Theorem, reduced in size, or at least adversely affected to reduce substantially infrared radiation output from the radiating plate surface by preventing proper flame combustion.

The gas moving means in each apparatus 16 also includes gas exhaust opening 56 having at least (and preferably much greater) flow cross-sectional area than the flow cross-sectional area of gas discharge nozzle 50 and being similarly oriented with respect to surface F1 of element 12 but located on the downstream side of gas stream 42 from heating zone 40 and discharge nozzle 50. Preferably, the mouth of each exhaust opening 56 is larger in dimension 50W than discharge nozzle 50 since gas stream 42 to be exhausted has swelled in volume since it has picked up heat and moisture so that a larger volume has to be exhausted through gas exhaust opening 56. Two apparatuses 16 in FIG. 2 have two exhaust openings 56 exhausted by common exhaust fan 60 through ducts 58 (each having duct surfaces 58a and suitable turning vanes 58b) and outlet duct 62 to the outside of tower 14. Duct 62 is shown schematically in FIG. 1 as two vertical outlet ducts for simplicity of illustration instead of the single outlet duct 62 in FIGS. 2 and 3. Air grills 58c, one in each duct 58, may be adjustably opened to adjust the draw in its associated opening 56 by controlling the admission of makeup air.

The efficiency of heat transfer and moisture vaporization and the high quality of fabric element 12 produced are readily apparent by considering the temperature of the air being exhausted in exhaust opening 56 and the temperature of fabric element 12 at the top end of heating zone 40 in this typical apparatus 16 in tier T2 and bank B1. In the aforegoing Table I, the temperatures of fabric element 12 and of the exhausting air are respectively 200° F. Hence, there has been a good heat transfer and scrubbing action between air stream 42 and fabric element 12 and most of the infrared energy supplied has gone into vaporizing water since neither the discharged gas nor fabric element are above the boiling point of water. Since element 12 picks up very little more heat as it travels upwardly in tower 14 in FIG. 1, the temperature of element 12 can still be maintained at about only 200° F. (from table I) at the top of apparatus 16 in tier T8, if so desired. Also, the fabric temperature of 200° F. is well below the maximum temperature before the aforementioned fibers are damaged by heat. For example, excessive heat when element 12, if made of certain types of nylon, still contains substantial amounts of water, might cause chemical degradation at temperatures as low as 250° F. so element 12 would not be damaged by drying apparatus 16 but might be damaged by the 600° F. fabric temperature mentioned in the aforementioned Kersker U.S. Pat. No. 3,250,641 not using a high velocity gas stream.

Also, this fast drying action makes possible production of cord fabric without a "webbed" condition, wherein the adhesive liquid forms a hardened film across the open mesh of the fabric securing adjacent cords together.

The substantial increase in drying rate and substantial reduction in drying equipment size is shown since drying tower 14 in FIG. 1 and Table I will dry coated element 18 (made of a particular fabric and weave) to the same state of satisfactory dryness while traveling in direction T in:

1. Five tier heights when using 2,000 f.p.m. air velocity stream 42 at nozzle 50.
2. Eight tier heights when not using air stream 42. This means that adding air stream 42 gives about a 38 percent reduction in height of tower 14.

Temperature Controlled Heating or Drying by Heating Apparatus 16

Apparatus 16 may be used for rapidly heating up element 12 to a preselected temperature and then maintaining the temperature of outer surface F1 by the cooling action by gas stream 42, with or without moisture removal, and with or without additional control means mentioned hereafter. Hence, apparatus 16 can be used for controlled heating of element 12 for any purpose. The gas in stream 42 may be air at ambient conditions, as described heretofore; gas saturated with water molecules; heated air; etc. when only heat up to a preselected temperature and maintenance there is desired without drying for moisture removal.

Suitable control means may be provided, responsive to the temperature of element 12, for maintaining element 12 at a preselected heated temperature by controlling the output of at least one, and perhaps all, of the following aforementioned means in apparatus 16: (1) gas moving means for moving gas stream 42 over element 12, (2) drive means for relatively moving element 12 through machine 10 in FIG. 1, and (3) heating means 18. This control means may take any of a plurality of forms shown schematically in FIGS. 6 and 7 of the drawings. One form of such control means shown herein for purposes of illustration includes thermocouple 101 responsive to the downstream temperature of element 12 in FIG. 6 (above apparatus 16) for closing switch 104 in FIG. 7 by its thermocouple signal amplifier 102 if the temperature of element 12 exceeds the preselected temperature so as to energize by closed switch 104 one or more of the circuits formed between lines L1 and L2 with the selection of any one of more circuits determined by circuit selector 106, adapted to permit manual selection of one or more of these known circuits or automatically programmed to select specific circuits depending upon the operational characteristics and conditions encountered by machine 10. Such circuit selector 106 can be of any conventional type.

The variety of circuits that can be formed through circuit selector 106 when switch 104 is closed will be individually described in the paragraphs hereafter. The formation of any one of these circuits by closed switch 104 will tend to decrease the temperature of fabric element 12 sensed by thermocouple 101 as the processing continues.

Control means can be selected for increasing the quantity of gas (cubic foot per minute) flowing in stream 42 by the gas moving means upon closing of switch 104 so as to lower the temperature of element 12 in either of two ways. First, air stream discharge fan 44 in FIGS. 2, 3 and 7 is motor driven for moving gas stream 42. The control means includes fan motor speed controller 108 of any suitable type adapted to increase the speed of fan motor 44 upon closing of switch 104 to increase the quantity of gas in stream 42. Second, solenoid actuated two-way valve 109 of any conventional type may be energized to supply air pressure from line 73 to the left end of cylinder and piston unit 112 in FIG. 7 located within the operating link between cylinder 76 and damper 88 in FIG. 7 for opening damper 88 more fully to leave more gas be discharged through nozzle 50. The piston in unit 112 is normally biased by spring 114 to its contracted position to exhaust the air from the left end of cylinder 112 through two-way valve 109 when switch 104 is open deenergizing the solenoid in valve 109.

Control means can be selected to control the drive means for relatively moving element 12 so as to lower the temperature of element 12. Closing switch 104 energizes motor controller 116 of any conventional type for speeding up motor 118 driving rolls 22, 23 and/or 24 to speed up movement of fabric element 12 in direction T through machine 10, if the processing action permits this speedup, so as to cool the element 12 by exposing it to less heating by apparatus 16.

Control means can be selected to reduce the infrared heat output by heating means 28 by a suitable throttle means controlling the gas fuel input thereto from gas line 34 for controlling the heat output from the face of its infrared panel 31 in either of two suitable ways so as to lower the temperature of element 12. First, closing switch 104 may energize solenoid gas throttling valve 120 in series with valve 35 in main burner gas line 37 for reducing the gas fuel supply to burners 32 in panel 31 so as to reduce their infrared heating output and thus cool element 12 by controlling the flow of this fuel fluid. Second, closing switch 104 energizes motor controller 122 of any conventional type for slowing down the speed of the driving motor on gas-air mixer 35a so that the quantity of gas-air mix supplied to burners 32 in panel 31 is reduced to decrease the heat output therefrom and thus cool element 12.

Hence, it should be apparent that element 12 may be cooled by normal gas stream 42 supplemented by energizing solenoid valve 109 and/or 120, and/or motor controller 108, 116 and/or 122 in FIG. 7 by one or more of the parallel circuits from closed switch 104 to line L2. It should be apparent that the circuit selected, after switch 104 is closed, from circuit selector 106 to line L2 will depend upon the manual or automatic selection by selector 106 so that any one, two or more of these circuits may be thus energized to reduce the temperature of element 12, whichever is desired during the setup of machine 10.

When the temperature of element 12 has dropped sufficiently so that the signal from thermocouple 101 opens switch 104, the cooling circuit for element 12 through selector 106 is broken and element 12 is permitted to increase in temperature in the same manner as occurred before switch 104 closed.

When apparatus 16 operates as a heater (without drying), as described in the present section, the infrared generated heat products removed from element 12 are heat.

It should be apparent that much of the description about drying apparatus 16 in the earlier section of this specification and in the next section about plurality of apparatuses 16 applies when apparatus 16 is a heater, as described in the present section, or is a dryer.

Plurality of Drying Apparatuses 16 in FIG. 2

In any given tier of apparatuses 16 in tower 14 in FIG. 1, such as tier T2, the two horizontally aligned apparatuses 16 straddling opposite faces F1 and F2 of fabric element 12 have certain common structures, modes of operation and advantages as they coact together, as mentioned in more detail in the following paragraphs describing the stopping of element 12 and infrared shutdown action, reflector side plates 90, gas flow ducts 92, elimination of backup reflector to fabric element 12, simultaneous heating or drying and aeration of both sides of fabric element 12, minimizing lateral flapping of element 12 by gas stream 42, etc.

When the driving action of drive rolls 22, 23 and 24 in FIG. 1 on element 12 is shut down so as to stop the relative movement of element 12, it is important in each of the 16 apparatuses 16 in tower 14 to immediately shut down infrared radiation from heating means 28 in all apparatuses 16 and to continue the flow of gas stream 42 undiminished, by continued energization of the gas moving means, so as to relatively move gas stream 42 with respect to and over surfaces F1 and F2 of element 12 in all heating zones 40 so as to prevent residual heat from heating means 28 from raising the temperature of and damaging element 12. This action will be described herein for only one or two apparatuses 16 since the 16 in tower 14 are simultaneously controlled in the same manner. Here, inlet fan 44 and exhaust fan 60 in FIGS. 2 and 3 operate continuously so as to run when fabric element 12 is stopped as well as when it is being driven in the direction T during fabric processing, heating or drying. In fact, it is preferred to increase the gas quantity flowing in stream 42 during this infrared shutdown because fabric element 12 is not moving and cannot escape from heating zone 40, and infrared heating means 28 has a great deal of residual heat radiating onto element 12. Also, increased gas flow now does not adversely affect radiation from gas infrared burners 32 since they are now shut down. Also, it is desirable either to cover the radiating face of each panel 31 or to retract each panel away from fabric element 12. The mechanism to be described hereafter provides this action for both apparatuses 16 in tier T2 in FIG. 1 (both in banks B1 and B2), and is shown in more detail in FIGS. 2 and 7. In FIG. 7, rotation actuated switch 68 (having its switch contact open during stopping of drive roll 23 and having its switch contact closed when fabric element 12 is being driven in direction T by the drive rolls) opens its switch contact upon stopping of movement of fabric element 12 in direction T in heating zone 40 so as to deenergize each solenoid gas valve 35 controlling main burner gas line 37 to each panel 31 in tier T2 in FIG. 2 and deenergizes solenoid operated four-way valve 72 by breaking their energizing parallel circuits between power lines L1 and L2. Deenergizing solenoid operated four-way valves 72 connects air pressure line 73 to one end of double-acting burner panel retracting cylinder 74 and to one end of double-acting gas flow damper cylinder 76 and connects its exhaust port 72a to the other ends of these cylinders. This action extends the length of cylinder 74 so that its upwardly moving piston rod in FIG. 2 swings arm 78 clockwise on pivot 79 so that bellcranks 80 on parallel pivot shafts 79, connected by link 82 will cause bellcranks 80 to swing clockwise in FIG. 2 to retract panels 31 away from element 12 from their solid line to their dot-dash line positions since the opposite ends of links 82 and 84 and the distal end of arm 78 have pivot connections. The upper end of each panel 31 is supported by at least one pair of trolley rollers 86 travelling in opposite channels of I-beam 87 forming one of the upper structural members 14a in each apparatus 16 in tower 14. This action also causes double-acting gas flow damper cylinders 76 to move, through either a rigid link or the extensible link having piston and cylinder unit 112 in FIG. 7 now acting rigidly, quadrant-type damper 88 in FIG. 2 from a partially open position in gas nozzle duct 48 assumed while fabric element 12 is driven in direction T by the drive rolls during normal heating or drying to a fully open position during infrared shutdown to increase the gas discharge rate from nozzle 50 to increase gas stream 42 for cooling surfaces F1 and F2 of element 12 to protect them against residual heat from straddling heating means 28. When element 12 begins to travel in direction T, switch 68 closes to reverse this action so as to open gas valve 35, to contract cylinder 74 to advance panels 31 back to their solid line positions, and to move damper 88 back to its partially open position so that each apparatus 16 is now ready for heating or drying again. During this reverse action, four-way valve 72 moves to its opposite position to connect air pressure line 73 and its exhaust port 72a respectively to said other and said ones ends of said cylinders in the conventional four-way valve operating manner to reverse the action of cylinders 74 and 76.

Each of the two panels 31 in any given tier, such as tier T2 in FIGS. 1—3, has secured to each of its vertical side surfaces in FIGS. 6 and 8 reflector plate 90, four in number for each tier, adapted to telescope together over each edge of fabric element 12 in straddling relationship when the burner panels are in their solid line positions in FIG. 2 as shown in FIG. 8. Then, these four reflector plates 90 form two generally parallel reflector means extending along direction T of relative movement of element 12 and straddling the opposite edges of element 12 for heating these edges in heating zones 40 more uniformly by infrared radiation by reflecting the infrared radiation back onto these edges of the fabric, since these edges would not otherwise get sufficient radiation since they are close to the edge of panels 31. Hence, these reflector plates assure uniformity of infrared radiation over full width W of fabric element 12 by capturing the infrared radiation that would otherwise escape laterally through the gap between panels 31.

Flow ducts or flow channels 92 are formed, one duct on each side of fabric element 12, for conveying the gas in each gas stream 42 as an air curtain from its discharging nozzle 50 to its exhaust openings 56. Each gas flow duct 92 extends along the length of element 12, has element 12 surface F1 or F2 as one wall thereof, and is mounted to receive gas stream 42 from discharge nozzle 50 for keeping gas stream 42 flowing over and close to this element surface and for discharging the gas stream 42 into discharge opening 56 for exhausting from tower 14.

Each vertically extending flow channel or duct 92 for gas stream 42 is formed by surface face F1 or F2 of element 12, reflector plates 90 and the radiating face of heating panel 31 of heating means 28 with these two ducts 92 each being rectangular in cross section, generally parallel, and straddling element surfaces F1 and F2. Movement of reflector plates 90 with retractable burner panels 31 between the solid and dot-dash line positions in FIGS. 2 and 6 does not matter because they will return to their telescoped relationship to form the sides of flow ducts 92 each time burner panels 31 are moved to their advanced and solid line position in FIG. 2.

Each duct 92 plays an important part during travel of its stream 42 from discharge nozzle 50 to exhaust vent 56. Duct 92 guides, holds laterally compact and prevents lateral dispersion of stream 42 to maintain the flow action of stream 42 in direction T along element 12 and toward exhaust vent 56 while keeping stream 42 in close contact with element face F1 or F2.

Although two ducts 92 and four reflector plates 90 have now been described for two apparatuses 16 in FIGS. 2, 3 and 8 for convenience, it should be apparent that a single duct 92 straddled by only two reflector plates 90 give the same advantages for a single apparatus 16.

If only one gas stream 42 were used, element 12 might be laterally deflected and laterally flapped by this one gas stream 42 to put unnecessary tension on fabric element 12, to distort the shape of gas duct 92, to move element 12 away from heating means 28, and/or to provide other disadvantages. This is not true when two apparatuses 16 are used, as shown in FIG. 2. Then, fabric element 12 is maintained substantially taut and planar against lateral deflection and flapping by the gas streams since this deflection and flapping is minimized by having the gas discharge means in each apparatus 16, including the two gas streams 42, symmetrically straddling element 12, and by having rolls 22, 23 and 24 suitably driven to exert sufficient tension on element 12 between rolls 23 and 24.

There are other advantages in having two apparatuses 16 facing each other at each tier, such as tier T2 in FIG. 1, with one apparatus 16 in each bank B1 and B2. Then, these two heating apparatuses 16 are mounted with their two heating zones 40 having sandwiched therebetween the generally coinciding opposite faces F1 and F2 of element 12 so that each dries one of the opposite generally coinciding parallel faces of element 12. This structural arrangement and coaction has a higher heating or drying heat; simultaneously heats or dries both sides of fabric element 12; more rapidly heats or dries fabric element 12; and requires no reflector behind element 12, such as would be necessary if only one drying apparatus were used. Such reflector frequently has a short useful wear life since it gets tarnished and tends to melt under the hot infrared radiation heat.

The eight apparatuses 16 in bank B1 in FIG. 1 in tiers T1—T8 arranged in series along direction T of travel of element 12 have certain advantages. Each of these apparatuses 16 has its own gas discharge nozzle 50 and gas exhaust opening 56 for generally uniformly processing width W of element 12 in series arranged heating zones 40 as element 12 moves upwardly in FIG. 1 past these eight series arranged apparatuses 16 in bank B1. Each of these eight drying apparatuses has its own vertically traveling gas stream 42 formed from relatively fresh, dry, cool air at ambient conditions sucked in from outside drying tower 14 for its discharge nozzle 50 and has water molecule saturated, or at least heavily laden, air (substantially raised in temperature) exhausted through exhaust opening 56 and outlet duct 62 at the top of drying tower 14 so as to not interfere with the flow of fresh, dry air into tower 14 for discharge nozzles 50. Having eight separate gas streams 42 is a substantial advantage over having a single gas stream 42 passing from the bottom to the top of tower 14. This single gas stream would (after it traveled more than one tier in height) be too heavily laden with water molecules to provide an effective scrubbing action for removal of evaporated water, be too heated up to provide an effective temperature control by cooling element 12, be too heavily concentrated with water molecules so as to prevent effective infrared transmission from heaters 32 to element 12, have lost its upward velocity so it would no longer scrub off the water molecules or remove the convection heat, not be able to be kept confined to surface F1 or F2 of fabric element 12 because it would lose its upward velocity, and not be able to be confined to a compact stream but would spread laterally and thus be totally useless. The advantage of dividing a single gas stream into eight separate series arranged gas streams 42 becomes more apparent when one realizes that the free vertical travel of each gas stream 42 at each tier in FIG. 1 is about 8 feet vertically in the typical installation of Table I while a single stream would have to travel about 100 feet traveling the vertical heights of drying tower 14. Also, it is possible by using the 16 separate drying apparatuses 16 in drying tower 14, arranged in horizontally opposed pairs and in eight series arranged pairs separately to control the infrared heating action and flow of gas stream 42 in each component apparatus 16 to match the existing and desired conditions of temperature and moisture removal from element 12 as it is progressively heated or dried as it moves vertically through tower 14. This would not be possible if a single gas stream were used for the whole height of tower 14. Also, it has been found during operation of tower 14 that the temperature of element 12 and the temperature of the discharged air at the top of each tier T1—T8 can be controlled to be approximately the same even though element 12 moves upwardly in tower 14 and becomes progressively drier.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

We claim:

1. An apparatus for drying a fluid treated continuous yarn or fabric fiber, comprising in combination:
   a. a heating zone having a gas discharge and gas exhaust in vertical spaced relation;
   b. a gas-fired heater with exposed flames for generating infrared radiation, disposed in the heating zone intermediate the gas discharge and gas exhaust;
   c. means for moving a continuous fiber vertically past the heater adjacent the gas discharge and gas exhaust;
   d. means for discharging a continuous stream of gas, under pressure, from the gas discharge towards the gas exhaust during operation of the heater; and
   e. means in fixed, unmovable relation to the heater, for channeling the gas stream adjacent and in contacting relation with the moving fiber and out of interfering relation with the exposed flames of the heater, such that the stream of gas helps dry the fiber without adversely affecting operation of the heater.

2. The apparatus of claim 1, which includes: means for exhausting gas, laden with heat products generated by the heater, through the gas exhaust.

3. The apparatus of claim 1, wherein the gas stream and fiber move in the same direction.

4. The apparatus of claim 1, wherein the gas exhaust is in vertical spaced relation above the gas discharge.

5. The apparatus of claim 1, wherein the gas channeling means includes a deflector adjacent the gas discharge for engaging gas passing under pressure therefrom and directing the gas towards the moving fiber.

6. The apparatus of claim 5, wherein the deflector includes a configured plate coextensive with the gas discharge and converging in a direction towards the moving fiber.

7. The apparatus of claim 6, wherein the gas includes air discharged from the gas discharge at the rate of about 1,000 to about 2,000 feet per minute.

8. The apparatus of claim 7, wherein the quantity of air discharged from the gas discharge is not more than about 1,500 cubic feet per minute.

9. A method for processing a tire cord, comprising the steps of:
   a. coating a tire cord with liquid adhesive for increasing the adhesion between the tire cord and rubber material used in the production of tires;
   b. moving the liquid coated tire cord past exposed flames of a plurality of gas fired infrared heaters disposed in vertical stacked relation to dry the adhesive coating; and
   c. simultaneously contacting the tire cord with successive streams of gas, under pressure, as the cord moves past the exposed flames of the heaters, to help dry the adhesive coating.

10. The method of claim 9, which includes: removing as much gas as possible from each gas stream after the gas scrubs the tire cord and becomes at least partially ladened with heat products generated by the infrared heaters.

11. The method of claim 10, which includes: channeling the streams of gas adjacent the moving tire cord out of interfering relation with the exposed flames of the infrared heaters.

12. The method of claim 11, which includes: moving the tire cord between exposed flames of opposing pairs of infrared heaters to heat the cord from opposing sides thereof.

13. The method of claim 12, wherein different streams of gas are used for every infrared heater the tire cord passes.

14. The method of claim 13, wherein the streams of gas are discharged towards the moving tire cord at a rate of from about 1,000 to about 2,000 feet per minute.

15. The method of claim 14, wherein each stream of gas after contacting the moving tire cord moves in a direction generally parallel to the tire cord until removed.

UNITED STATES PATENT OFFICE
CERTIFICATE OF CORRECTION

Patent No. 3,554,502          Dated January 12, 1971

Inventor(s) Grover W Rye and Alexander V Alexeff

It is certified that error appears in the above-identified patent and that said Letters Patent are hereby corrected as shown below:

Col 6, line 31, "1 liquid" should read -- 2 liquid --.
Col 8, line 28, "preferably" should read -- preferable --.
Col 9, line 16, "200°F." should read -- 200°F. and 186°F. --
Col 10, line 6, "of more" should read -- or more --.

Signed and sealed this 18th day of May 1971.

(SEAL)
Attest:

EDWARD M. FLETCHER, JR.          WILLIAM E. SCHUYLER, JR
Attesting Officer                Commissioner of Patents